Patented Sept. 13, 1932

1,877,316

UNITED STATES PATENT OFFICE

RICHARD HERZ, OF FRANKFORT-ON-THE-MAIN, AND MAX SCHUBERT AND WALTER BRUNNER, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

NEW INDIGOID DYESTUFFS

No Drawing. Application filed December 19, 1929, Serial No. 415,352, and in Germany December 22, 1928.

This invention relates to new valuable indigoid dyestuffs more particularly it relates to vat dyestuffs which probably correspond to the general formula:

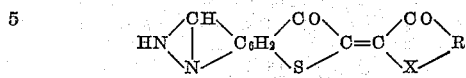

wherein the CH-group stands in the para position to the CO-group, the benzene as well as the pyrazole nucleus may contain alkyl groups, R means an aromatic residue and X stands for NH or S.

Our new dyestuffs are obtainable by condensing a hydroxy-thionaphthene compound of the general formula:

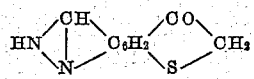

wherein the CH-group stands in the para position to the CO-group and the benzene as well as the pyrazole nucleus may contain alkyl groups, which compounds are described in our copending U. S. application Serial No. 415,351, filed December 19, 1929, and a compound of the general formula:

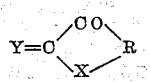

wherein R and X are identified as above and Y means $H_2$, O, $Cl_2$ or N-aryl. When using a compound wherein Y is $H_2$, the condensation is effected in the presence of an oxidizing agent. The second component may be identical with the first one.

The new vat dyestuffs yield bluish-grey to olive dyeings which show an excellent fastness to light and chlorine; the dyestuffs possess a remarkable levelling property. They are distinguished by a likely good affinity both to the vegetable and to the animal fiber, and in printing they are capable of being easily fixed on the fiber. Grey to olive vat dyestuffs for printing of such properties were hitherto unknown.

In order to further illustrate our invention the following examples are given, the parts being by weight and all temperatures in centigrade degrees. But we wish it to be understood that we are not limited to the particular conditions or specific products mentioned therein.

Example 1

30 parts of the hydroxy-pyrazole-thionaphthene, described in Example 1 of our U. S. application Serial No. 415,351, filed December 19, 1929, which compound probably corresponds to one of the following formulae:

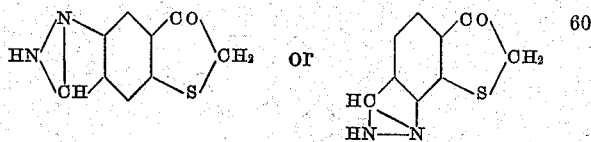

are made into a paste by means of 100 parts of alcohol and dissolved with 200 parts of a solution of caustic soda of 4% strength. Then an aqueous solution containing 10% of potassium ferri-cyanide are gradually added, or air is passed through the mixture, until the precipitation of the dyestuff is complete. The dyestuff which has separated is filtered off, washed with water and dried. It represents a black powder and probably corresponds to one of the formulae:

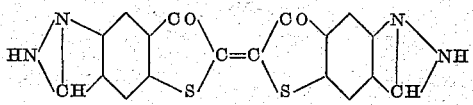

or

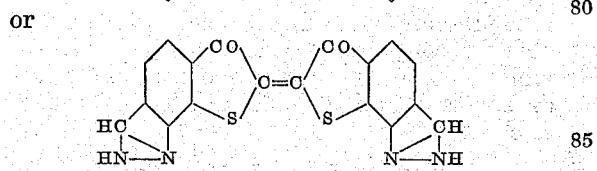

It dissolves in concentrated sulfuric acid to a blue solution. Cotton is dyed from a brownish yellow hydrosulfite vat in clear grey shades.

Example 2

When in Example 1 the hydroxy-pyrazole-thionaphthene is replaced by the equivalent amount of the hydroxy-methyl-pyrazole-thionaphthene described in Example 3 of our U. S. application Serial No. 415,351, filed December 19, 1929, and the process is otherwise carried out in the same manner, a new dyestuff is obtained which corresponds probably to the formula:

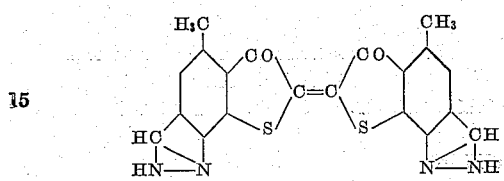

It represents when dry a black powder, soluble in concentrated sulfuric acid with a blue tint dyeing cotton from a brownish-yellow hydrosulfite vat clear grey shades.

Example 3

When N-methyl-hydroxy-pyrazole-thionaphthene, described in Example 2 of our U. S. application Serial No. 415,351, filed December 19, 1929, which compound probably corresponds to one of the formulae:

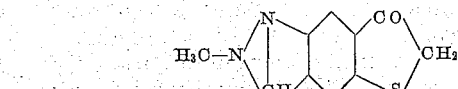

or

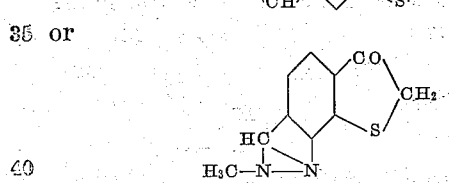

is subjected to the process of Example 1, a dyestuff is obtained which probably corresponds to one of the formulae:

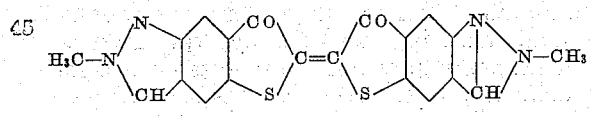

or

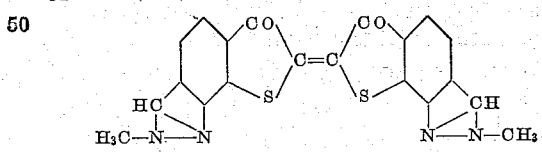

It represents when dry a black powder, soluble in concentrated sulfuric acid with a violet tint, dyeing cotton from a yellow hydrosulfite vat olive shades of a good fastness to boiling.

Example 4

20 parts of the hydroxy-pyrazole-thionaphthene used in Example 1 are dissolved in 800 parts of hot glacial acetic acid. The solution is poured into a solution of 30 parts of 3-hydroxy-5.6-benzo-thionaphthene-2-anil in 800 parts of glacial acetic acid. After the addition of 40 parts of anhydrous sodium acetate the mass is warmed for half an hour in a boiling water-bath. The dyestuff which has precipitated from the cold mass is filtered, washed with glacial acetic acid and with water and dried. It probably corresponds to one of the formulae:

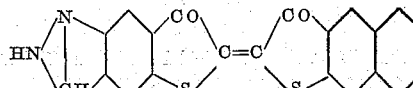

or

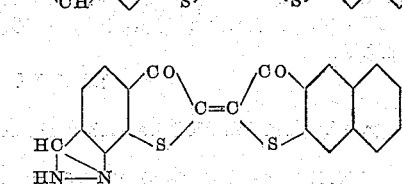

It represents a bluish-black powder, soluble in concentrated sulfuric acid with a bluish green tint, dyeing cotton from a brownish-yellow hydrosulfite vat bluish-grey shades.

Example 5

30 parts of 5-chloro-isatine are heated with 300 parts of mono-chloro-benzene and 35 parts of phosphorus penta-chloride in a salt-water bath for $1\frac{1}{2}$–2 hours at about 110°. To the clear solution thus obtained a hot solution of 26 parts of hydroxy-pyrazole-thionaphthene used in Example 1 and 300 parts of mono-chloro-benzene are added, and the mass is warmed for about half an hour in the boiling water bath. The dyestuff which has precipitated is filtered off, washed with mono-chloro-benzene and dried.

The new dyestuff probably corresponds to one of the formulae:

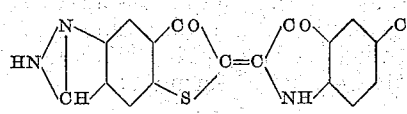

or

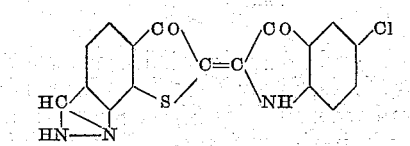

It represents a dark-blue powder, soluble in concentrated sulfuric acid with a blue tint and dyes cotton from a yellow hydrosulfite vat bluish-grey shades.

Example 6

A mixture of the hydroxy-pyrazole-thionaphthene used in Example 1 and of 4.5-benzo-isatine-2-chloride is heated with nitro-benzene to 150°. From the cold mass the dyestuff which has precipitated is filtered, washed and dried. It probably corresponds to one of the formulae:

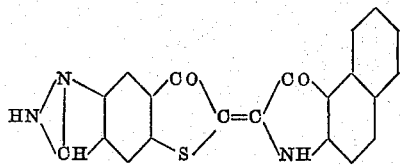

or

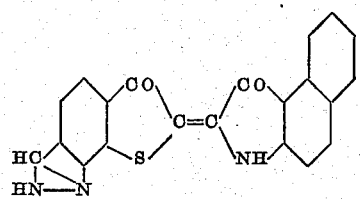

It dyes cotton olive green shades of a very good fastness and is distinguished by an excellent capacity of being fixed.

Example 7

When the same hydroxy-pyrazole-thionaphthene as used in the Example 1 is condensed with 6.7-benzo-3-hydroxy-thionaphthene-2-anil in the presence of glacial acetic acid, a new dyestuff is obtained which probably corresponds to one of the formulae:

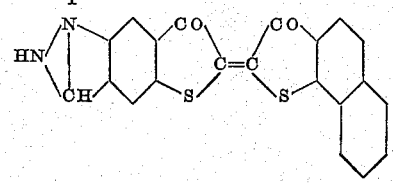

or

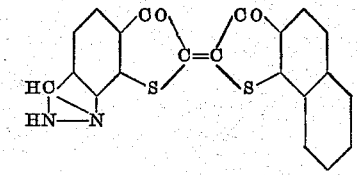

and dyes cotton fast grey shades.

We claim:

1. As new compounds the indigoid dyestuffs corresponding probably to the general formula:

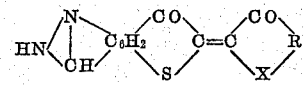

wherein the -S-atom and the -CO-group in the thiophene ring are attached to ortho-carbons of the benzene nucleus and the CH-group stands in the para position to the CO-group, the benzene as well as the pyrazole nucleus may contain alkyl groups, R means an aromatic residue and X means NH or S, which compounds are when dry colored powders, dyeing cotton bluish-grey to olive shades of an excellent fastness to light and chlorine and of a remarkable levelling property, having a likely good affinity both for vegetable and animal fiber, and being capable of being easily fixed on the fiber when used for printing cotton.

2. As a new compound the indigoid dyestuff probably corresponding to one of the formulae:

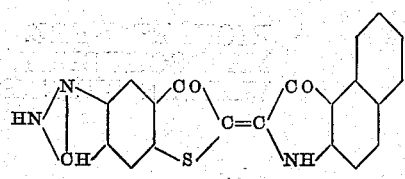

or

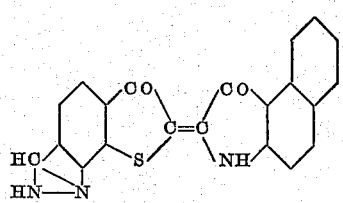

which compound is when dry a dark colored powder, dyeing cotton olive green shades of an excellent fastness to light and chlorine and of a remarkable levelling property, having a likely good affinity both for vegetable and animal fiber, and being capable of being easily fixed on the fiber when used for printing cotton.

3. As a new compound the indigoid dyestuff probably corresponding to one of the formulae:

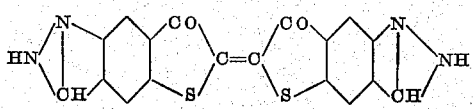

or

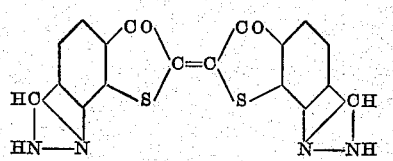

which compound is when dry a black powder dyeing cotton from a brownish-yellow hydrosulfite vat clear grey shades of an excellent fastness to light and chlorine and of a remarkable levelling property, having an equally good affinity for both vegetable and animal fiber, and being capable of being easily fixed on the fiber when used for printing cotton.

4. As a new compound the indigoid dyestuff probably corresponding to the formula:

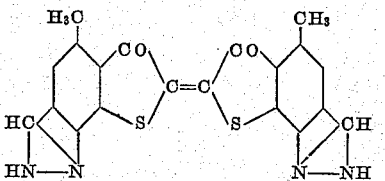

which compound is when dry a black powder dyeing cotton from a brownish-yellow hydrosulfite vat clear grey shades of an excellent fastness to light and chlorine and of a remarkable levelling property, having an equally good affinity for both vegetable and animal fiber, and being capable of being easily fixed on the fiber when used for printing cotton.

In testimony whereof, we affix our signatures.

RICHARD HERZ.
MAX SCHUBERT.
WALTER BRUNNER.